United States Patent
Aβmann et al.

(10) Patent No.: US 9,512,017 B2
(45) Date of Patent: Dec. 6, 2016

(54) MICRO-PLATE ELECTRODE CELL AND USE THEREOF

(71) Applicants: BAYER TECHNOLOGY SERVICES GMBH, Leverkusen (DE); BAYER CROPSCIENCE AKTIENGESELLSCHAFT, Monheim (DE)

(72) Inventors: Jens Aβmann, Haan (DE); Johannes Leonhäuser, Bergisch Gladbach (DE); Ivonne Görtz, Köln (DE); Christian Rämsch, Burscheid (DE); Frank Herbstritt, Alzey (DE)

(73) Assignees: Bayer Aktiengesellschaft, Leverkusen (DE); Bayer Cropscience Aktiengesellschaft, Monheim (DE)

( * ) Notice: Subject to any disclaimer, the term of this patent is extended or adjusted under 35 U.S.C. 154(b) by 0 days.

(21) Appl. No.: 14/770,521

(22) PCT Filed: Feb. 24, 2014

(86) PCT No.: PCT/EP2014/053491
§ 371 (c)(1),
(2) Date: Aug. 26, 2015

(87) PCT Pub. No.: WO2014/131713
PCT Pub. Date: Sep. 4, 2014

(65) Prior Publication Data
US 2016/0009575 A1 Jan. 14, 2016

(30) Foreign Application Priority Data
Feb. 27, 2013 (EP) .................................... 13156886

(51) Int. Cl.
*C02F 1/46* (2006.01)
*C02F 1/461* (2006.01)
(Continued)

(52) U.S. Cl.
CPC ......... *C02F 1/46109* (2013.01); *C02F 1/4672* (2013.01); *C02F 2001/46147* (2013.01);
(Continued)

(58) Field of Classification Search
CPC .............. C02F 1/46109; C02F 1/4672; C02F 2001/46152; C02F 2201/4611; C02F 2001/46157; C02F 2001/46147
See application file for complete search history.

(56) References Cited

U.S. PATENT DOCUMENTS 3,523,891 A * 8/1970 Mehl .................... C02F 1/46104
204/269
4,695,355 A 9/1987 Koziol
(Continued)

FOREIGN PATENT DOCUMENTS

DE 25 38 000 A 4/1976
DE 35 19 573 A1 12/1986
(Continued)

OTHER PUBLICATIONS

International Search Report dated Mar. 7, 2014, mailed Mar. 18, 2014.
(Continued)

*Primary Examiner* — Arun S Phasge
(74) *Attorney, Agent, or Firm* — Norris McLaughlin & Marcus, P.A.

(57) ABSTRACT

The invention relates to an electrolysis cell for the particularly efficient treatment of wastewater polluted with organic substances by electrooxidative degradation of the wastewater constituents contributing to the chemical oxygen demand, and also its use.

14 Claims, 6 Drawing Sheets

(51) Int. Cl.
*C02F 1/467* (2006.01)
*C02F 101/30* (2006.01)

(52) U.S. Cl.
CPC ............ *C02F2001/46152* (2013.01); *C02F 2001/46157* (2013.01); *C02F 2101/306* (2013.01); *C02F 2201/4611* (2013.01)

(56) References Cited

U.S. PATENT DOCUMENTS

| | | |
|---|---|---|
| 4,954,230 A | 9/1990 | Kirch |
| 5,316,644 A | 5/1994 | Titterington et al. |
| 7,232,507 B2 | 6/2007 | Gattrell et al. |
| 2004/0069621 A1 | 4/2004 | Gestermann et al. |
| 2006/0144709 A1 | 7/2006 | Belt |
| 2008/0156642 A1 | 7/2008 | Fryda et al. |
| 2008/0314764 A1 | 12/2008 | Schrott et al. |
| 2012/0037497 A1 | 2/2012 | Pancurák et al. |
| 2013/0026096 A1 | 1/2013 | Nitta et al. |

FOREIGN PATENT DOCUMENTS

| | | |
|---|---|---|
| DE | 37 05 956 C2 | 9/1988 |
| DE | 44 26 901 A1 | 2/1995 |
| DE | 43 30 518 A1 | 3/1995 |
| DE | 197 08 296 A1 | 9/1999 |
| DE | 100 25 167 A1 | 12/2001 |
| DE | 20 2005 003720 U1 | 7/2006 |
| DE | 10 2005 006 214 A1 | 8/2006 |
| DE | 603 06 172 T2 | 6/2007 |
| EP | 0 045 148 A1 | 2/1982 |
| EP | 0 659 691 B1 | 5/1998 |
| JP | 326 6 617 B2 | 3/2002 |
| JP | 2011 246 799 A | 12/2011 |
| KR | 101 080 227 B1 | 11/2011 |
| KR | 10 2012 002 189 A | 1/2012 |
| WO | 01/15792 A1 | 3/2001 |
| WO | 2004/013379 A1 | 2/2004 |
| WO | 2008/056336 A1 | 5/2008 |
| WO | 2012/004769 A1 | 1/2012 |

OTHER PUBLICATIONS

M. Panizza and G. Cerisola, "Application of diamond electrodes to electrochemical processes" in Electrochimica Acta 51 (2005), p. 191-199.

M.A. Rodrigo et al., Modeling of Electrochemical Process for the Treatment of Wastewater Containing Organic Pollutants, in: C. Comniniellis and G. Chen (eds.), Electrochemistry for the Environment, Springer LLC (2010), Chapter 4; p. 99-124.

A. Kraft, "Doped Diamond: A Compact Review on a New, Versatile Electrode Material"; Int. J. Electrochem. Sci., 2 (2007), p. 355-385.

Christos Comninellis—Guohua Chen; "Electrochemistry for the Environment"; Springer Science+Business Media, LLC 2010; p. 1-563.

\* cited by examiner

MICRO-PLATE ELECTRODE CELL AND USE THEREOF

This application is a 371 application of PCT/EP2014/053491 filed Feb. 24, 2014, which claims foreign priority benefit under 35 U.S.C. §119 of European Application No. EP 13156886.7 filed Feb. 27, 2013.

The invention relates to an electrolysis cell for the particularly efficient treatment of wastewater polluted with organic substances by electrooxidative degradation of the wastewater constituents contributing to the chemical oxygen demand.

One method of treating wastewater polluted with organic substances is to subject the wastewater to an electric current in an electrolysis cell which is equipped with anodes having a high overpotential for the formation of oxygen. Above a particular potential difference between the electrodes, stepwise oxidation of the dissolved organic constituents of the electrolyte (wastewater) takes place at the anode, with this oxidation being able to proceed directly or via intermediate reactive species depending on the choice of anode material and possibly further process conditions. Known electrode materials which are suitable for this purpose are, for example, platinum on tantalum, niobium and/or titanium, various metal oxides such as $PbO_2$, $IrO_2$ or $SnO_2$ and mixed oxides of Ta/Ir, Ta/Pt, Ta/Pd or Ta/Rh (e.g. DE 44 26 901 A1) or else carbon-based materials such as glassy carbon or electrically conductive diamond, in each case on metallic supports or graphite.

An anode material which has been found to be particularly suitable for the electrooxidative degradation of organic contaminants is diamond which has been made conductive by doping with boron (BDD) (e.g. EP 0 659 691 B1 or DE 197 08 296 A1), which is, for example, applied in microcrystalline layers by plasma-assisted CVD processes to suitable substrates (e.g. Nb, Ta, Mo, Ti, Si or glassy carbon). Compared to other anode materials known to date, these diamond layers display a particularly high overvoltage for the generation of elemental oxygen, a high chemical resistance (including in respect of leaching), a significantly reduced tendency to form interfering deposits on the electrode surface and also a very high polarizability of the interface to the electrolyte (cf. M. Panizza and G. Cerisola, "Application of diamond electrodes to electrochemical processes" in Electrochimica Acta 51 (2005) 191-199).

Owing to the very high oxygen overvoltage, it is possible in the case of BDD anodes to apply a sufficiently high voltage to form free hydroxyl radicals (OH.) on their surface in the electrolyte; these free hydroxyl radicals act as a very strong oxidant and are thus able to break up and oxidize, in a stepwise manner, a broad range of organic compounds dissolved in the electrolyte. When the process is applied for a sufficiently long time, the water-soluble organic compounds which are usually present at least in traces can be essentially completely mineralized and thus made unproblematical in this way. As long as no saturation effects occur, the formation of the free hydroxyl radicals proceeds virtually stoichiometrically, i.e. for each electron taken up by the anode, one free hydroxyl radical, which can, as intermediate reactive species, subsequently bring about the oxidation of an oxidizable molecule dissolved in the electrolyte, is formed from one water molecule of the electrolyte.

The method therefore has in principle a high current efficiency; under suitable conditions, this is actually virtually 100%. However, it is limited by the very short life of the free hydroxyl radicals: if these decompose before they have interacted with an oxidizable species in the electrolyte, their oxidation potential is irrevocably lost and the current efficiency decreases. The short life is accompanied by an extremely short physical reach of the free hydroxyl radicals, as a result of which they are virtually completely localized at the anode surface. Complete reaction of the electrolytically formed free hydroxyl radicals in the sense of a further reaction with oxidizable species from the electrolyte therefore occurs only when the latter are present in sufficient concentration at the anode surface. Since oxidizable species which are stable during the electrolytic wastewater treatment are degraded in the immediate vicinity of the electrode surface, an equilibrium concentration which decreases continually during the course of the process at a limited total electrolyte volume is established after a short time; this equilibrium concentration is determined firstly by the current-dependent rate of degradation of oxidizable species and secondly by their arrival as a result of convective and diffusive mass transfer and is in any case below the average concentration in the volume of the electrolyte. As soon as the flow of oxidizable species to the anode becomes smaller than the current-dependent fresh formation of free hydroxyl radicals, part of the latter decomposes unutilized and the current efficiency of the process and also the initially constant degradation rate decrease. Since the mass transfer from the volume of the electrolyte to the anode surface is in the last instance always diffusive in nature, this state always occurs, at a given cell geometry and given flow conditions, when the concentration of oxidizable species in the volume of the electrolyte goes below a particular concentration which is proportional to the current density.

For this reason, if a given amount of wastewater is to be treated in a limited time to a prescribed residual concentration of oxidizable contaminants, it is necessary, at given mass transfer properties of the cell, to provide not only a suitable choice of the working current but also a particular minimum anode area. Since boron-doped diamond electrolytes in particular are associated with very high capital costs per unit area, it is desirable for economic reasons to keep this required anode area as small as possible by optimization of mass transfer in the cell and thereby allow operation at high current densities but also high current efficiency.

In order to represent the relationships quantitatively, it is useful to introduce the chemical oxygen demand (COD), which indicates the theoretical amount of oxygen which would be required to oxidize the oxidizable contaminants present in the wastewater completely under particular (standardized) conditions, as a measure of the concentration of oxidizable species, i.e. of the degree of contamination of wastewater with oxidizable substances. The following quantitative examination is based essentially on: M. A. Rodrigo et al., *Modeling of Electrochemical Process for the Treatment of Wastewater Containing Organic Pollutants*, in: C. Comninellis and G. Chen (eds.), *Electrochemistry for the Environment*, Springer LLC (2010).

Over the course of the electrochemical treatment, the concentration of oxidizable substances in the wastewater and thus its COD decreases gradually. Above a limit value $COD_{lim}$ which is dependent on the cell and the flow conditions therein and also on the diffusion behaviour of the oxidizable species, the concentration of oxidizable species at the anode is always greater than that of the free hydroxyl radicals formed and the degradation proceeds stoichiometrically with the charge introduced; thus, at a constant current I linearly with time:

$$\frac{dCOD(t)}{dt} = -\frac{I \cdot V_R}{4F}$$

Here, $F=9.45 \cdot 10^4$ Cmol$^{-1}$ is the Faraday constant and $V_R$ denotes the volume of the wastewater reservoir undergoing treatment, which is generally circulated repeatedly by means of a pump from the stock vessel through the electrolysis cell. Below $COD_{lim}$, the flow of the oxidizable species from the volume of the electrolyte to the anode becomes the determining factor for the degradation rate which in turn is proportional to the concentration of this species in the electrolyte volume, and so:

$$\frac{dCOD(t)}{dt} = -\frac{I \cdot V_R}{4F} \cdot \frac{COD(t)}{COD_{lim}}$$

$COD_{lim}$ itself is determined by the current density $j=I/A$ (A=anode area) and the mass transfer coefficient $k_m$:

$$COD_{lim} = \frac{I}{4F \cdot k_m \cdot A}$$

Thus, the course over time of the COD below $COD_{lim}$ is, finally, dependent on the working current and the previously linear degradation goes over into an exponential, i.e. increasingly slower, degradation rate:

$$COD(t) = COD_0 \cdot \exp\left(-\frac{k_m A}{V_R} \cdot t\right)$$

In this operating state, the current efficiency, i.e. the ratio of the numbers of charge carriers used to charge carriers utilized for the oxidation of oxidizable species, decreases continually with decreasing residual COD:

$$ICE(t) = \frac{COD(t)}{COD_{lim}}$$

and the duration of the process, starting out from an initial value $COD_0$ to a target value $COD_{end}$ is given by:

$$t_{end} = \left[\frac{COD_0}{a \cdot I} + \frac{1}{k_m \cdot A} \cdot \ln\left(\frac{COD_{lim}}{COD_{end}}\right)\right]$$

To be able to operate such a purification process in a very short time with very high current efficiency and thus energy efficiency to a very low residual concentration of oxidizable contaminants, it is therefore necessary to choose a sufficiently high value for the product $k_m A$ of mass transfer coefficient and anode area. Since BDD anodes in particular are very expensive, firstly because of the high price of the refractory metals (Nb, Ta, Mo) which are preferably used as substrates and secondly due to the complicated production of the diamond coating, it is desirable for economic reasons alone to optimize the mass transfer in the cell as far as possible.

To a certain extent, $k_m$ can be increased by increasing the electrolyte volume flow through a given cell. Thus, information on defined flow or fluid velocity ranges in the cells can be found in various documents of the prior art (e.g. DE 37 05 956 C2, DE 43 30 518 A1 or DE 44 26 901 A1). However, this procedure is subject to economic limits since the pressure drop in the circulation system and thus also the power consumption of the circulation pump increase rapidly with increasing volume flow. Apart from increased energy costs, there are thus also increased capital costs for larger piping and pump technology above a particular point.

Another possible way of improving the current efficiency of the electrooxidative wastewater treatment at low COD values is to add particular substances which are converted at the anode into strong intermediate oxidants having a significantly longer life compared to the free hydroxyl radicals to the electrolyte. If this life is long enough, the corresponding species can in turn be transported from the anode into the volume of the electrolyte and there bring about additional oxidation processes (mediator effect). $NaSO_4$ has been found to be particularly useful for this purpose; this is usually added in concentrations of from a few 1 g/l to a few 10 g/l to the electrolyte and is converted in the process into peroxodisulphate which has a strong oxidizing action (e.g. DE 10 2005 006 214 A1). Furthermore, other sulphates (e.g. DE 44 26 901 A1) and also various further salts which act as strong oxidants (e.g. perchlorates, hypochlorites: cf. DE 37 05 956 C2) are possible as mediators and these are added either in their oxidized or reduced form to the electrolyte and cyclically reduced in the volume of the electrolyte and reoxidized at the anode in the process. However, the effect of such mediators in increasing the current efficiency at low COD values is quite limited and cannot be increased at will by increasing the mediator concentration. In addition, the addition of additional substances to the wastewater to be treated, in particular of salts which can usually only be separated off again with a high outlay, is in many applications permitted only to a very limited extent and is in principle rather undesirable.

A particularly useful approach to increasing the current efficiency of the electrooxidative wastewater treatment at low COD values is therefore optimization of the cell geometry and the associated flow of the electrolyte in the cell in order to intensify mass transfer, particularly at the anode, by very strong convective components. For this purpose, U.S. Pat. No. 7,232,507 B2 describes, for example, an arrangement of planar, alternately stacked anodes and cathodes with mesh-like insulator films located in-between, which have been introduced into a fluid-tight housing and through which flow occurs parallel to the electrode surfaces. The mesh-like or woven fabric-like configuration of the insulators and optionally one of the electrodes here serves to repeatedly divert the electrolyte and thus ensures mass transfer which is quite intensive over the entire electrode area. However, this arrangement has the disadvantage of the quite complicated internal contacting of the electrodes. In particular, all constituents of the anode contacting which are in contact with the fluid are subjected to very high corrosive stress during the electrooxidative wastewater treatment and therefore have to be made of expensive and mostly difficult-to-process materials (e.g. niobium) as are also used for the anode substrates.

Furthermore, arrangements having electrodes which are equipped with either rib-like, knob-like or channel-like structures and around which or through which flow occurs essentially along their surface are known. Examples of such arrangements are given, inter alia, in DE 35 19 573 A1, DE 25 38 000 A1, DE 100 25 167 A1, JP 326 6 617 B2 or WO 2008 056 336 A1. Here too, repeated changes in flow direction ensure intensified mass transfer but, owing to the comparatively long fluid paths through the cell, lead to sometimes quite high pressure drops. In addition, the production of relief-like structures such as troughs or ribs from the materials which are preferably used for BDD electrodes is fairly complicated.

To meet the requirement for low pressure drops, arrangements in which electrodes provided with openings are stacked and flow occurs essentially in the direction of the stack, i.e. predominantly perpendicular to the electrode surface have also been proposed. Here, a description is given of embodiments which have geometrically unspecified openings and are either generally presented as permeable (e.g. WO 2012 004 769 A1 or KR 10 2012 002 189 A1) or, for example, are described as wire braid (DE 603 06 172 T2). Furthermore, there are embodiments which have geometrically at least qualitatively more precisely defined openings such as holes or slits and are either arranged aligned between the individual planes of the stack (JP 2011 246 799) or their relative position between the planes of the stack is not explicitly indicated and therefore can be assumed to be not more precisely defined (e.g. KR 101 080 227 B1). As reference cell for the power comparison with the microlamellar electrode cell of the invention, use was made, for example, of a commercially available laboratory cell which consisted essentially of a stack of electrodes through which flow occurred essentially along the stacking direction and which were each composed of annular frames and an expanded metal sheet welded into this.

While a whole series of mostly fine-pored substrate forms such as wire braids, sinter frits or metal foams cannot be coated, or be coated only with great difficulties, with BDD in a stable manner, electrode arrangements having defined openings aligned in the main flow direction have unfavourable mass transfer properties from the beginning. In comparison, in the case of arrangements having undefined relative positioning of the electrode openings within the electrode stack, a certain, mostly random, offset, as required for mass transfer, of the openings in adjacent planes within the electrode stack can be expected, but the potential of such geometries for making mass transfer more intense is by far only unsatisfactorily exploited unless shape, size and relative positioning of the openings both within the electrodes and also in respect of the adjacent electrodes are defined in a suitable way.

It is therefore an object of the invention to develop a flow cell for electrooxidative wastewater purification by means of electrodes coated with conductive diamonds, which cell has, owing to its geometry, significantly improved mass transfer from the electrolyte to the electrodes (especially to the anode) compared to conventional cells. The cell should additionally have a simple structure which is inexpensive to realize, a low pressure drop and a high stability, in particular in respect of corrosion occurring during operation.

The object is surprisingly achieved by an electrolysis cell comprising at least one inlet and at least one outlet for the electrolyte, further comprising a number of planar electrodes provided with openings through which flow can occur, of which at least one is, by means of functional coating, configured as anode having an increased overpotential for the formation of oxygen compared to the standard hydrogen electrode and at least one further electrode is configured as counterelectrode (cathode), which, on the basis of their polarity, are arranged in an alternating or pairwise alternating sequence to form a stack, further comprising a number of frame elements which in each case are arranged singly between neighbouring electrodes, where the frame elements simultaneously ensure mutual electric insulation, mutual fluid sealing and a defined spacing between the adjoining electrodes and the electrode stack formed in this way is installed between the inlet and the outlet in such a way that an electrolyte path through which flow can occur and which is sealed fluidically from the surroundings is formed from the inlet through the electrode stack to the outlet, characterized in that neighbouring electrodes have a mutual clear spacing of not more than 0.5 mm, the openings through which flow can occur in the electrodes are configured as parallel slits or rows of slits which break through the electrodes essentially perpendicularly to the surface thereof, where the individual slits have a width of not more than 1 mm and a length of at least three times the width and have a clear spacing perpendicular to their maximum dimension of at least twice the slit width and the slits or rows of slits in neighbouring electrodes in each case run parallel to one another and are arranged in a defined offset manner relative to one another perpendicularly to the maximum dimension of the slits or rows of slits in such a way that the spacing between one row of slits in an electrode to each immediately adjacent row of slits in the directly adjacent electrodes varies by not more than 25%.

The invention therefore provides an electrolysis cell of this type, which will hereinafter also be referred to as microlamellar electrode cell.

The substantial advantage of the electrolysis cell of the invention compared to the prior art is that the defined geometry and relative alignment of the openings in the electrodes lead to high mass transfer coefficients at relatively low pressure drops.

The specific combinations of further, sometimes known individually, characteristics result in, as further advantages of the electrolysis cell according to the invention compared to the predominant part of the prior art, that the planar electrodes or electrode substrates provided with openings through which flow can occur can be produced simply and inexpensively by two-dimensional parting methods such as laser or water jet cutting by commercially readily available semifinished parts such as foils or metal sheets and provided by means of available methods with stable and homogeneous surface coatings (e.g. BDD), contacting of the electrodes can take place, for example, by means of contact tabs formed or installed on the edge of the electrodes outside the region which conveys fluid and is thus exposed to corrosive attack by the electrolyte, the high degree of functional integration (spacers, electric insulation, fluidic sealing) of the frame elements consisting of one or a few individual component(s) allows a very simple and thus also inexpensive-to-realize cell structure and in particular The electrodes configured as anodes are normally provided with a deliberately applied surface layer which when used with predominantly aqueous electrolytes have a particularly high overvoltage for the generation of oxygen and ideally promote the electrolytic generation of free hydroxyl radicals. Coatings comprising particular metal oxides such as $PbO_2$, $IrO_2$ or $SnO_2$ or mixed oxides of Ta/Ir, Ta/Pt, Ta/Pd or Ta/Rh or carbon-based materials such as glassy carbon, electrically conductive diamond-like carbon (DLC) or electrically conductive diamond have been found to be useful in this context. However, preference is given to using coatings comprising electrically conductive diamond, in particular those comprising boron-doped diamond (BDD), where the layer thickness is preferably from 1 µm to 5 µm. For application of the coating, all methods known to those skilled in the art and suitable for this purpose are in principle possible; in the case of electrically conductive diamond layers, these are, for example, plasma-assisted CVD (chemical vapour deposition) processes.

If the cell contains more than one anode and more than one cathode, these are arranged either alternately ("AKAK") or pairwise alternately ("AAKKAAKK", "AKKAKK" or "AAKAAK"), but preferably alternately, within the electrode stack in the cell.

While the electrodes configured as cathodes in the cell can in principle be made up of any electrically conductive material which can withstand the mechanical, chemical and thermal stresses during operation, preference is given here to using, for example, stainless steels, copper, aluminium and alloys thereof or else graphite, optionally also nickel-based alloys, the base material selected for the electrodes configured as anodes should be a material which, going beyond these requirements, is, in particular, a suitable substrate for the functional (electrocatalytically active) coating of the electrode and is able to withstand the particularly high electrochemical corrosive stresses during operation even when the coating has areas of damage or points of leakage which result in direct contact of the electrode substrate with the electrolyte. The suitability as substrate for the surface coating thus encompasses, inter alia, the compatibility of the material with the conditions of the coating process, very good matching of the coefficient of thermal expansion with that of the coating, good adhesion of the coating, small and controllable interdiffusion between base material and coating material and optionally specific surface properties which can positively influence the deposition or growth behaviour of the coating. Preferred base materials for the anodes are therefore, particularly in the case of coating with conductive diamond, the metals niobium, tungsten, tantalum, molybdenum, titanium or alloys thereof and also doped silicon which form a stable and diffusion-impermeable oxide layer (passivation layer) under the electrooxidative conditions during operation. Particularly preferred base materials for the anodes are niobium, tantalum or titanium, particularly preferably niobium.

Especially for economic reasons, manufacture of the electrodes (or in the case of the anodes the substrates) from sheet-like semifinished parts such as foils or metal sheets having thicknesses in the range from 0.2 mm to 3 mm, preferably from 0.5 to 1.5 mm, has been found to be advantageous. Selection of a very small thickness of material is in principle desirable because of the usually high price of the material. However, a sufficient stiffness in bending has to be ensured, firstly to prevent flaking-off of the functional (electrocatalytically active) coating during or immediately after production thereof, e.g. as a result of thermal stresses during cooling, and secondly to ensure a sufficiently precisely defined spacing of the electrodes over their total area during operation, i.e. under the pressure exerted by the flowing electrolyte.

The lateral shaping of the electrodes or electrode substrates is preferably effected by two-dimensional contour-defining parting processes such as water jet cutting, laser cutting or shape etching, particularly preferably by water jet cutting. Depending on the structure of the construction, in particular the frame elements, introduction of sealing grooves can additionally be necessary, in which case they are preferably introduced by milling or sink eroding, particularly preferably by milling (optionally also HSC milling).

The number and size of the electrodes, in particular the anodes, and thus their total area A which is effective in the process defines, in conjunction with the mass transfer coefficient $k_m$ achieved in the cell, the introduced electric current $I=j \cdot A$ and the total volume V of electrolyte to be treated (wastewater), the (generally time-dependent due to saturation effects) rate of decrease of the chemical oxygen demand. Dimensioning should consequently be such that, at a prescribed initial value, a desired end value of the COD can be reached within a usually prescribed period of time.

In order to achieve particularly good mass transfer properties at a given total anode area while nevertheless achieving a pressure drop which is not too high in the cell, it is advantageous in the next step to match the number (and thus size) of the electrode, their mutual spacing and the width and the mutual spacing of the slits or rows of slits to one another and to the flow of electrolyte through the cell appropriately. Here, it can be assumed that an increase in the number of electrodes fluidically connected in series, a reduction in the clear spacing between the electrodes, an increase in the thickness thereof, a reduction in the slit width in the electrodes, an increase in the mutual spacing of the slits or rows of slits within the electrodes and an increase in the electrolyte flow through the cell will in each case lead to an increase both in the mass transfer coefficient and also in an increase in the pressure drop. The increase in the pressure drop always occurs in a higher power of the respective parameters mentioned here than the increase in the mass transfer coefficient and therefore has to be weighed up in the design. Slit widths in the range from 0.1 to 1.5 mm, slit spacings in the range from 2 mm to 10 mm and clear electrode spacings in the range from 0.1 mm to 0.5 mm have been found to be preferred. Slit widths in the range from 0.2 to 0.8 mm, slit spacings in the range from 3 mm to 8 mm and clear electrode spacings in the range from 0.2 mm to 0.4 mm can be considered to be particularly preferred, with the slit width preferably being no greater than half the electrode thickness. Further embodiments of the cell of the invention in which the spacing of the slits or rows of slits within each electrode and also in all electrodes within the cell varies by not more than ±10% and is particularly preferably constant can also be considered to be advantageous. Embodiments of the cell of the invention in which the mutual spacing of adjacent slits or rows of slits in adjacent electrodes varies by not more than ±10% and is particularly preferably constant can likewise be considered to be preferred. For manufacturing reasons, it can be advantageous to configure the arrangement of the slits or rows of slits by a suitable offset from a line of symmetry of the outer contour of the electrode in such a way that the geometry of the anodes is derived from the geometry of the cathodes by mirror reflection about the axis or rotation by 180°, or vice versa.

The frame elements arranged between the electrodes can in each case consist of a single component or a plurality of components, with the functions as spacer, electrical insulation element and fluidic sealing element optionally being able to be distributed over these components. In the simplest case, the frame elements consist of a uniform, electrically insulating material having a defined elastic (optionally also partially plastic) deformation behaviour and have a uniform thickness. A layer-like construction of the frame elements with an elastic, electrically insulating layer on the two sealing surfaces and a stronger core material (e.g. in the form of a sheet or a woven fabric) which gives the frame element additional mechanical strength is also possible. At the same time, defined pressing of such a frame element between the electrodes leads to a defined clear spacing, fluidic sealing and also an electrical insulation effect between the electrodes in each case adjoining the frame element. In this case, preference is given to using elastomeric materials, in particular those having a high chemical resistance, in which a reliable sealing effect is achieved even at low pressing pressures over the area. Generous dimensioning of the seal width, with values in the range from 5 mm to 15 mm having been found to be useful here, enables the variation in the sealing height over a wide range of clamping forces to be kept so low that sufficiently accurate definition of the electrode spacings is possible even at a very rough definition of these clamping forces (e.g. via the tightening torques of the screws used for clamping). Such one-piece frame elements can advantageously be manufactured by, for example, water jet cutting or stamping from commercial elastomeric films and are suitable for very simple, inexpensive and compact constructions of a microlamellar electrode cell according to the invention when the pressure, temperature and chemical resistance requirements which these have to meet are not too high. If semifinished parts made of a suitable material having the desired thickness are available, this embodiment of the frame element can be considered to be preferred.

In a further possible embodiment of the frame elements, these consist of a spacer frame which has a defined thickness and is in each case made of an electrically insulating material or is coated, at least on the side facing the electrodes, with electrical insulation and also of an elastic sealing element which together with the spacer frame is installed in the gap between the electrodes defined by this spacer frame. The sealing element is preferably in each case located tightly within the spacer frame, so that the latter acts as support element, i.e. the sealing element is supported against the pressure of the electrolyte present in the cell. In this way, it is possible to realize frame elements which also allow sealing between the electrodes in the presence of relatively high electrolyte pressures. For reasons of improved handling, it can also be advantageous for the sealing element to be adhesively joined (e.g. by vulcanization onto or into) to the spacer element.

In a third variant of the frame elements, these consist of a spacer frame which has a defined thickness and is in each case made of electrically insulating material or is coated, at least on the side facing the electrodes, with electrical insulation and also of one or two elastic sealing elements inserted in grooves in the adjoining electrodes. By moving the sealing function into the region of the electrodes, this embodiment makes it possible to use even very thin spacer frames which can preferably be produced from thin polymer films, particularly preferably from fluoropolymer films (e.g. PTFE, PFA or FEP). Particularly small interelectrode spacings can consequently be realized in this way. Manufacture of the spacer frames can be carried out with a small outlay, e.g. by laser or water jet cutting, in larger numbers also particularly economically by stamping. As sealing elements, preference is given to O-rings which are available in a wide variety of dimensions and materials (e.g. NBR, EPDM, FKM or FFKM). Depending on the stiffness of the spacer frame, two sealing elements directly opposite one another or two sealing elements which are offset in a parallel direction are used. In the case of very thin spacer frames having a low bending stiffness, it can also be sufficient to use only one sealing element per spacer frame.

For electrical contacting of the electrodes, it has been found to be advantageous to equip these with contact tabs in such a way that the contact tabs in the installed state project from the electrode stack and can thus be connected to the respective pole of the power supply outside the cell volume in which the electrolyte is present. In the simplest and preferred case, the contact tabs are an integral constituent of the geometry of the electrodes or electrode substrates and thus result directly from manufacture. The contact tabs particularly preferably have a hole and are stacked in such a way that the holes of the tabs which in each case belong to the same electrode polarity (anode/cathode) are arranged flush relative to one another, contact washers whose thickness corresponds to the clear spacing between adjacent electrodes of the same polarity are inserted between adjacent contact tabs and the electrodes of the same polarity are in this way electrically connected in their entirety or in groups, e.g. by screwing, and can be equipped with a common inlet line for power supply.

The electrolysis cell of the invention is preferably used for the electrooxidative degradation of, in particular, organic contaminants in wastewater which is obtained locally in relatively small to medium amounts or flows with moderate COD pollution but because of their damaging effect on water bodies cannot be introduced directly into a public wastewater network or a biological water treatment plant. Examples of such impurities are active compounds from crop protection formulations or medicaments, residues from the production or handling of chemicals and also residues of propellants and/or cleaning agents. Use of the electrolysis cell of the invention appears to be particularly useful in the case of wastewater occurrence of from a few 10 l/h to a few 1000 l/h at COD contents of from a few 0.1 g/l to a few 10 g/l.

As operating parameters for use in these fields of application, it has been found to be useful to employ current densities in the range from 1 $kA/m^2$ to 5 $kA/m^2$, preferably in the range from 2 $kA/m^2$ to 3 $kA/m^2$, and also circulation flows through the cell which lead to superficial velocities within the slit openings in the electrodes in the range from 0.3 m/s to 3 m/s, with an increase in the flow velocity generally leading to an increase in the current yield of the cell in the transport-limited operating range. The current yield of the cell in the transport-limited operating range can be increased even further by addition of soluble sulphates (e.g. $NaSO_4$) in a concentration range of from about 2 g/l to about 50 g/l, preferably from 5 g/l to about 20 g/l.

Owing to the optimized mass transfer properties of the electrolysis cell of the invention, this can be used not only for the electrooxidative treatment of wastewater but can also be advantageously employed in further fields in which the high oxidation potential of species localized at the anodes (e.g. free hydroxyl radicals) is to be used for chemical reaction of constituents of the electrolyte. Examples of such an advantageous use of the microlamellar electrode cell may be found in the electrolytic synthesis of chemicals, e.g. strong oxidants such as ozone, hydrogen peroxide, peroxodisulphates, peroxocarbonates, permanganates etc., especially when very complete reaction of the starting substances (reduced forms) with a high current yield is required, and also in the electrochemical sterilization of water.

The following examples illustrate the performance of the electrolysis cell of the invention with the aid of particular embodiments of the cell and the instrumentation, but without restricting these:

EXAMPLE 1

Electrochemical Oxidation Using a Cell of Conventional Geometry

A synthetic wastewater containing 2 g/l of phenol and 1 g/l of sodium chloride in deionized water was made up. 3 l of the solution were placed in the experimental apparatus consisting of reservoir and return vessel with pH measurement and gas extraction, centrifugal pump, flowmeters and electrolysis cell and admixed with 120 g of sodium sulphate. The solution was subsequently electrochemically treated at room temperature for 5.5 hours at 100 mA/cm$^2$ (corresponding to 16 A) and a circulation volume flow of 950 l/h using a commercially available laboratory electrolysis cell having expanded metal electrodes. The expanded metal meshes welded into circular frame plates had a mesh opening of about 7.5 mm, a web width of about 2.4 mm, a thickness of about 2.0 mm and were aligned approximately parallel to one another between the planes but were not in any defined position relative to one another. Anodes and cathodes were arranged directly alternately ("AKAK"). The clear spacing between neighbouring electrodes was about 1.5 mm, and their active area was 40 cm$^2$. The conductivity of the solution at the beginning of the experiment was 45 mS/cm, with a voltage of 6.2 V being established at the electrode. The power input during the experiment was adjusted manually a number of times in order to maintain a constant value. During the time of experiment, samples were taken and analysed in respect of COD and phenol. The course over time of the measured COD values is shown in FIG. 7a) together with a fitted model curve.

EXAMPLE 2

Electrochemical Oxidation Using a Microlamellar Electrode Cell According to the Invention A synthetic wastewater was made up by the same method as in Example 1. The same amount of wastewater was admixed with the same amount of sodium sulphate as in Example 1 and electrochemically treated for 3 hours at a current density of 167 mA/cm$^2$ (corresponding to 32 A) using a microlamellar electrode cell according to the invention at the same volume flow as in Example 1. The cell was equipped with 2 mm thick electrodes which were provided with 0.7 mm wide slits in a regular parallel arrangement with a clear spacing from one another of in each case 6.7 mm. The slits were positioned so that they were in each case located precisely in the middle between the slits of the neighbouring electrodes within the electrode stack. The number and sequence of the electrodes was selected so as to be identical to that in the comparative cell of Example 1. The active area of the electrodes was in each case 48.5 cm$^2$, and their clear spacing was 0.3 mm. At the beginning of the experiment, a conductivity of 46 mS/cm was measured and a voltage of 5.8 V was established. During the experiment, samples were taken and analysed in respect of COD and phenol. The course over time of the measured COD values is shown in FIG. 7b) together with a fitted model curve. A comparison with FIG. 7a) clearly shows that the COD value at which the current-limited linear COD reduction goes over into the transport-limited exponential COD decrease is substantially reduced despite the higher initial current density. Modelling of the curves gives a mass transfer coefficient for the microlamellar electrode cell which is a factor of from 3 to 4 higher than in the case of the conventional cell, so that significantly shorter treatment times combined with an overall higher current efficiency and thus (also in combination with a lower voltage drop over the cell) a reduced total energy input are obtained.

The invention is illustrated by way of example with the aid of the following figures but without being restricted thereto. The figures show.

Figure 1:
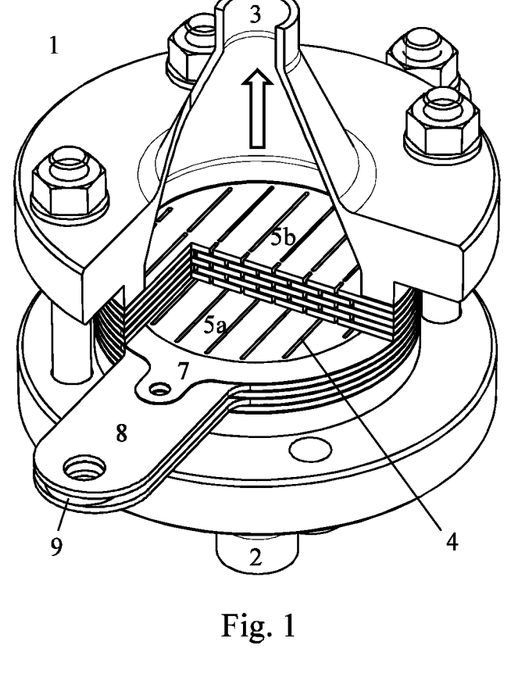
FIG. 1 a microlamellar electrode cell according to the invention in perspective and partly angle-cut view.

FIG. 1) shows a microlamellar electrode cell (1) according to the invention in perspective view, partly cut to illustrate the internal structure: a plurality of anodes (5a) and cathodes (5b) are assembled with frame elements (7) composed of elastomeric film arranged in-between to form a stack (6—cf. FIG. 2) which is clamped in a fluid-tight manner between an inlet (2) and an outlet (3). The electrodes are provided with equidistant parallel slits which are offset relative to one another by half their midpoint spacing in adjacent planes so that the electrolyte runs along a meandering path with repeated division and recombination at each electrode when passing through the electrode stack. Each of the electrodes is provided with a connection tab (8) which projects in a tongue-manner from the otherwise essentially circular base outline of the electrodes. The connection tabs of all anodes project in a coinciding manner on the one side of the stack, while those of the cathodes project on the opposite side. Contact washes whose thickness corresponds to the thickness of an electrode of the opposite polarity plus the thickness of two frame elements and thus completely fills the space between the contact tabs are inserted between adjacent connection tabs. Clamping of the contact tabs arranged opposite one another by means of in each case a contact pin (10) joins all anodes and all cathodes in a conductive manner and these are thus connected in parallel as a bundle to the respective pole of the current source.

Figure 2:
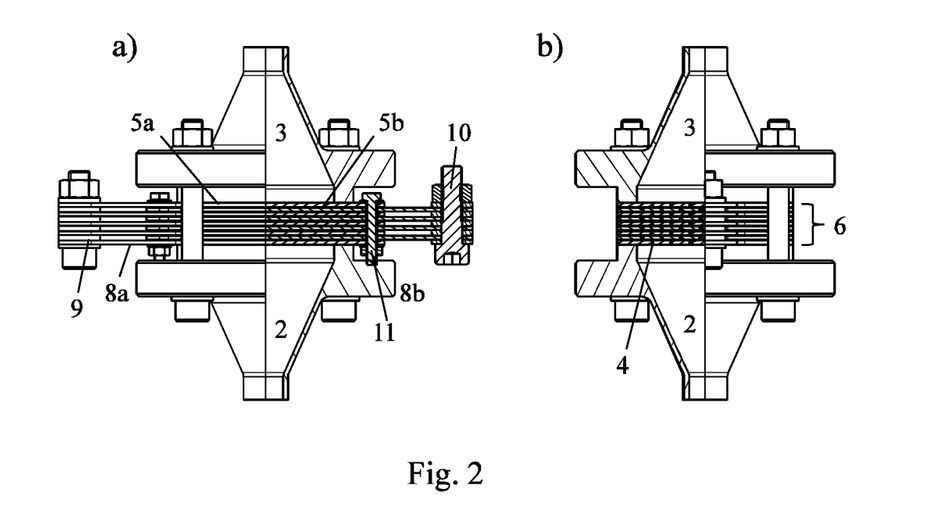
FIG. 2 a microlamellar electrode cell according to the invention in two mutually orthogonal side views, in each case half cut longitudinally.

FIG. 2) shows the microlamellar electrode cell depicted in FIG. 1 in two mutually perpendicular side views, in each case in half section through the middle plane (a) or slightly offset thereto (b). The directional view here runs perpendicular in a) and parallel in b) to the middle plane of the cell defined by the axes of the contact pins and running parallel to the slits and also the main flow direction of the electrolyte.

Figure 3:
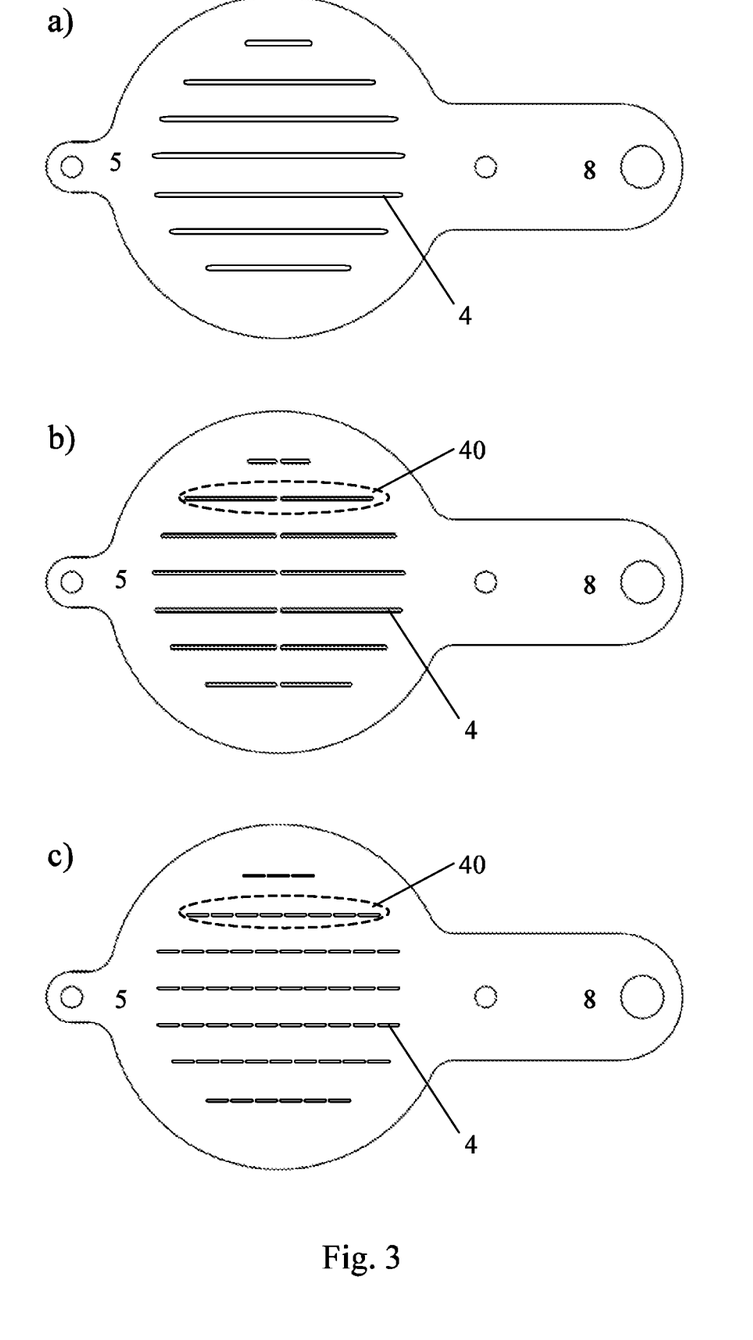
FIG. 3 illustrative electrode base outlines having different embodiments of slits therein.

FIG. 3) shows three illustrative electrode base outlines having different embodiments of the slit openings (4) introduced therein. While these can extend over the entire inflow cross section (generally defined by the internal contour of the frame elements), especially in the case of relatively small, relatively thick electrodes, as shown in FIG. 3a), it is sometimes advantageous, particularly in the case of relatively large and/or relatively thin electrodes, to support the electrode lamellae running between the slit openings against one another over particular distances by interruption of the slits (FIG. 3b/c). In this way, parallel rows of slits (40) replace the original slits (4). For example, the support webs between the lamellae can be distributed in common alignments over the electrode, as shown in FIG. 3b). As an alternative, an equidistant arrangement as per FIG. 3c), for example, is also possible, which in the case of a uniform length of the rows of slits (e.g. in the case of a rectangular inflow cross section of the electrode) can also coincide with case 3b). Furthermore, irregular arrangements of the support webs are possible and can, depending on the shape of the inflow cross section of the electrode, also be advantageous, e.g. for static or hydrodynamic reasons.

Figure 4:
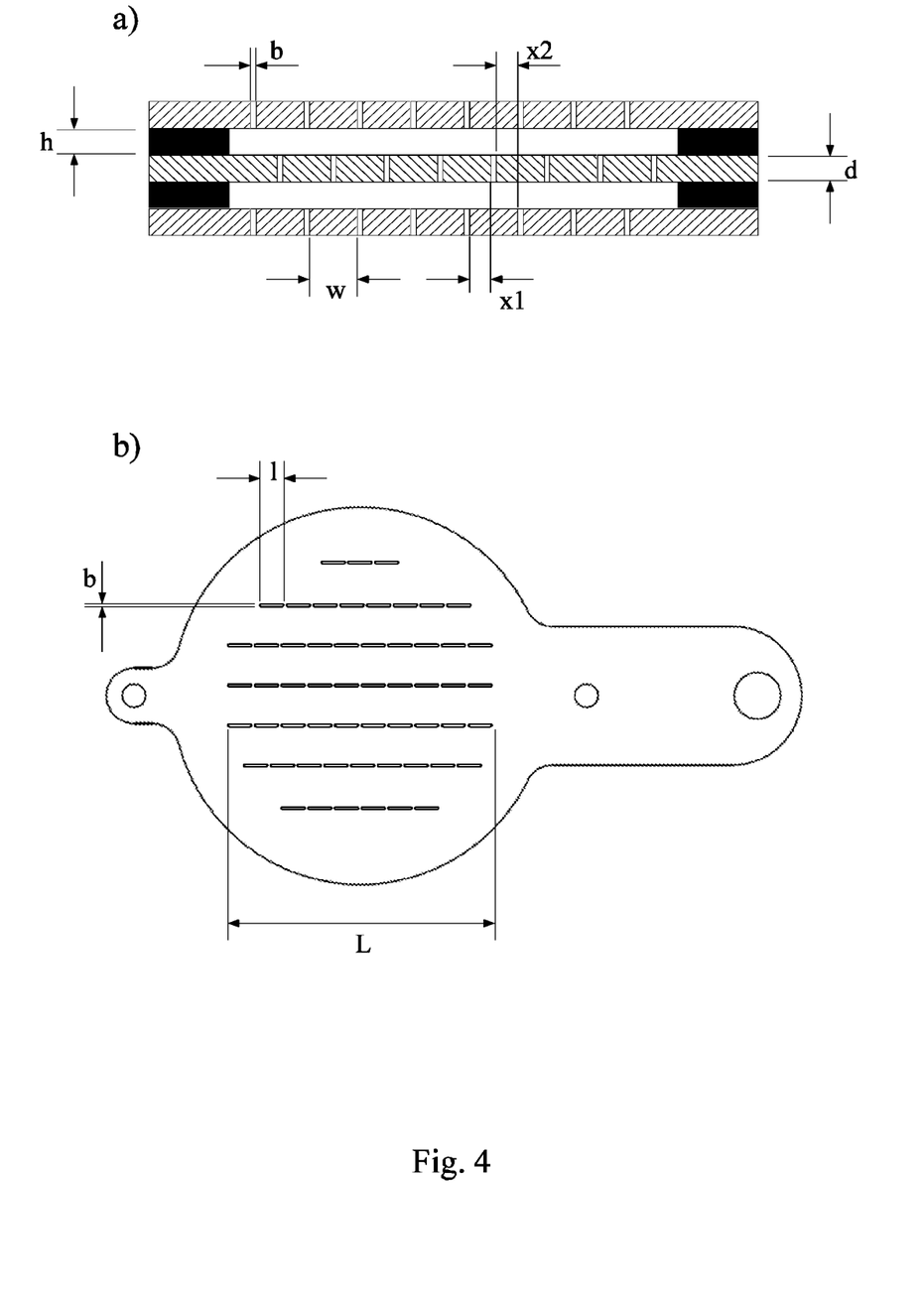
FIG. 4 a schematic longitudinal section through an electrode stack (part), viewed in the direction of the alignment of the slit openings in the electrodes, and also an illustrative electrode base outline, in each case with designation of the relevant geometric parameters.

FIG. 4) shows the hydrodynamically relevant geometric parameters of the electrode stack or the electrodes and respective geometric elements: FIG. 4a) shows, in schematically reduced form, the section of an electrode stack of a microlamellar electrode cell in longitudinal section perpendicular to the orientation of the slit openings or rows of slits. The electrode thickness d, the clear electrode spacing h, the slit width b, the clear slit spacing w and the spacings x1 and x2 of adjacent slits in adjacent electrodes are indicated here. In the most general form of the microlamellar electrode cell of the invention, these parameters can vary within the limits specified in the claims within each electrode and between the electrodes, so that, for example, the distances of one slit from all its (up to six) neighbours are different within particular limits. FIG. 4b) illustrates the definition of the width b and the length of the slits l or the rows of slits L.

Figure 5:
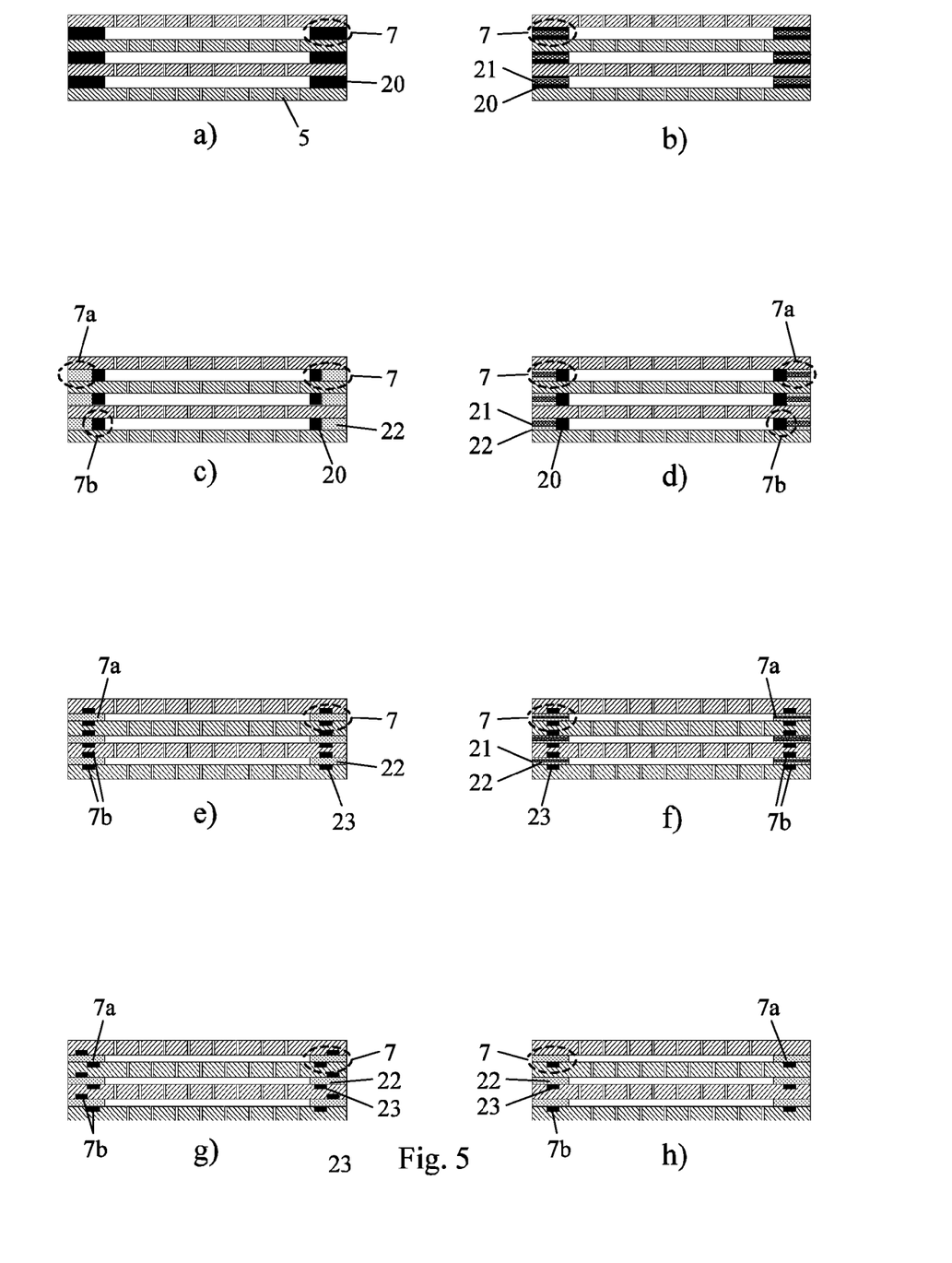
FIG. 5 a schematic longitudinal section through an electrode stack (part) with different embodiments of frame elements.

FIG. 5) shows by way of example, with the aid of a section of an electrode stack of a microlamellar electrode cell depicted in schematically reduced form in longitudinal section, a series of possible embodiments of frame elements (7). These are in the simplest case (FIG. 5a) cut out of a planar elastomeric film (20). To increase the compressive strength, this elastomeric film can also be reinforced by a stiff core (21, e.g. metal film, wire or fibre braid) (FIG. 5b). Construction of the frame elements of a sealing element (7b) composed of elastomeric material (20) and a spacer element (7a) which is arranged outside and is composed of a stiff, electrically insulating material (22), which thus assumes a support function for the sealing element, can likewise serve for stabilization against the internal pressure in the cell. The spacer element can in turn be made up in one piece of uniform material (FIG. 5c) or as composite element with integrated reinforcement (21) (FIG. 5d). If very small electrode spacings are to be achieved, spatial relocation of the sealing function into grooves in the electrodes can be useful in order to allow a sufficient pressing distance of the sealing elements at an appropriate (i.e. not too high) relative spring deflection/pressing. FIGS. 5e) to 5h) outline possible configurations of the spacer element (7a) for this purpose, sometimes also with reinforcement (21), and different arrangements of the sealing elements (7b, e.g. as O-ring: 23). The embodiment shown in FIG. 5h) is possible when a floppy spacer element which is pressed sufficiently strongly by the sealing element (7b or 23) against the electrode surface opposite the sealing element is used.

Figure 6:
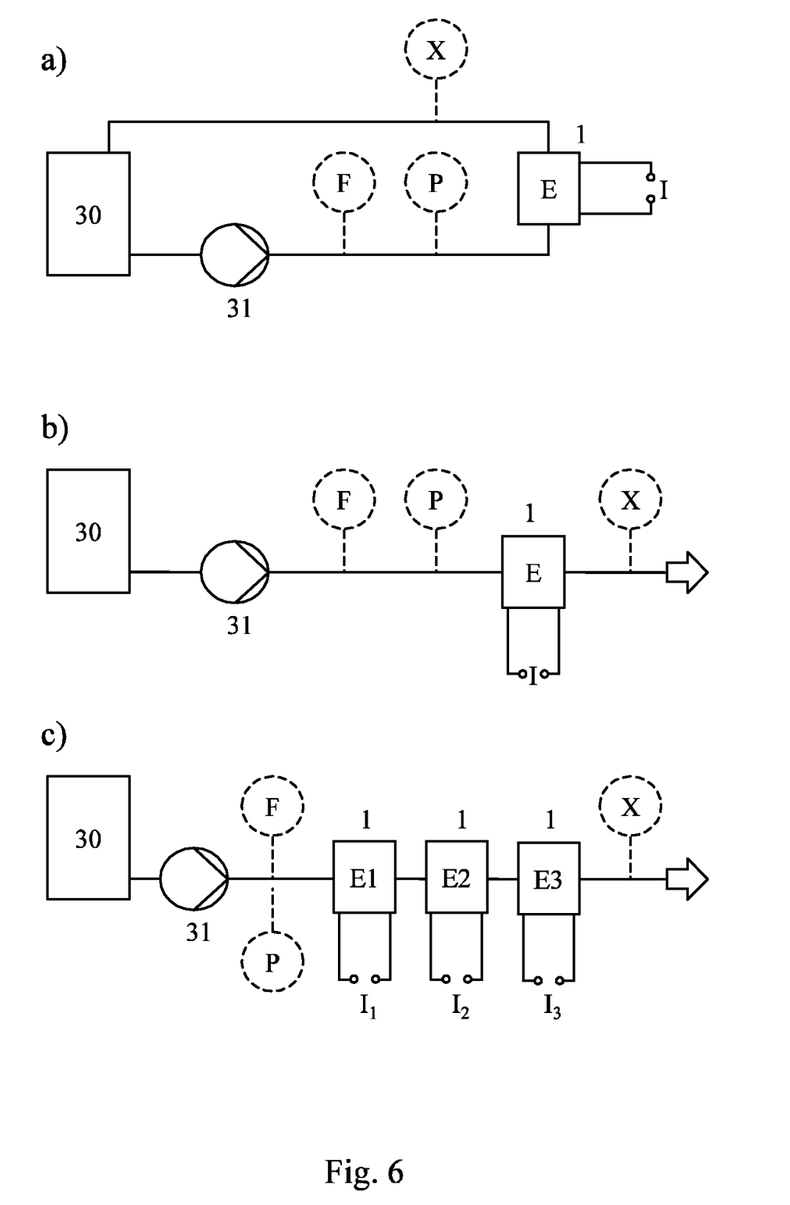
FIG. 6 simplified illustrative depictions of possible installation variants of the microlamellar electrode cell into a plant for the electrooxidative treatment of wastewater.

FIG. 6) shows, in illustrative and greatly simplified form, possible modes of operation of the microlamellar electrode cell of the invention. In most cases, the circulatory mode of operation depicted in FIG. 6a), in which the wastewater to be treated is introduced batchwise into a reservoir (30) and is conveyed to treatment in repeated cycles by means of a pump (31) through the cell (1 or E), will be useful. During each pass, only a relatively small decrease in the COD occurs, as a result of which the contaminant concentration within the cell is in each case largely homogeneous. The process can be monitored by means of various sensors (e.g. for pressure, mass flow, temperature, pH, conductivity, etc.) or in-line analytical methods and if appropriate controlled/regulated. In particular cases, especially in the case of not-too-high starting COD values and not-too-small target COD values, it is possible and can be useful to treat the wastewater in a single pass through the cell. In order to achieve the minimum flow velocities in the cell necessary for sufficiently good mass transfer, the cell has to be equipped with a comparatively large number of relatively small electrodes. In addition, electrode geometries having particularly small slit cross-sectional areas per electrode and particularly low interelectrode spacings are useful for this purpose. Compared to circulatory operation, a pump having a high head with a comparatively small volume flow is required here. Furthermore, it can sometimes be advantageous for a plurality of microlamellar electrode cells having different electrode geometries and configurations (with a pressure drop increasing in the flow direction) and optionally gradated (decreasing in the flow direction) current density to be fluidically connected in series (FIG. 6c).

Figure 7:
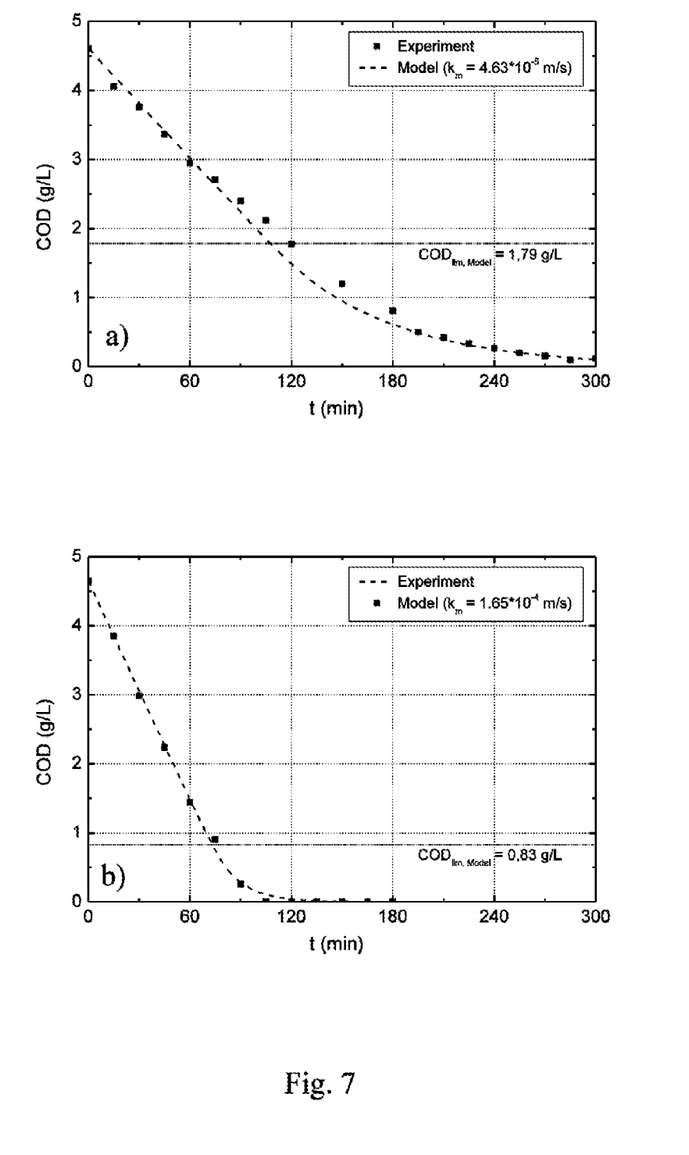
FIG. 7 the measured and calculated course over time of the COD (chemical oxygen demand) in illustrative experiments using a conventional cell (a) or a microlamellar electrode cell (b).

FIG. 7) shows the course over time of the COD in the two use examples described above. The graph 7a) shows the course of the COD in a synthetic wastewater sample (initial volume: 3 l) containing 2 g/l of phenol, 1 g/l of NaCl and 40 g/l of $NaSO_4$ during electrolytic treatment using a commercially available laboratory electrolysis cell having expanded metal electrodes at an electrolyte throughput of 950 l/h and 16 A (corresponding to 100 $mA/cm^2$). The fitting of a model curve gives a mass transfer coefficient of about $4.63*10^{-5}$ m/s for this experiment. In comparison, the graph 7b) shows the course of the COD in a comparative sample having the same composition and the initial amount, which was treated at the same circulation volume flow at 32 A (corresponding to about 167 $mA/cm^2$) using a microlamellar electrode cell. In this case, evaluation using the process model gives a mass transfer coefficient of $1.65*10^{-4}$ m/s, so that the breakdown process can, despite a higher current density, be operated over a greater COD range with full current efficiency and significantly shorter process times can therefore be achieved. In this example, the microlamellar electrode cell has the same base outline and inflow cross section as the conventional comparative cell, with the same number of electrodes but smaller construction height. Owing to the lower porosity of the electrodes, a larger active area per electrode and thus also better utilization of the area of the substrates was obtained for the microlamellar electrode cell.

LIST OF REFERENCE NUMERALS

1 Microlamellar electrode cell
2 Inlet
3 Outlet
4 Opening/slit in electrode
5 Electrode
5a Anode
5b Cathode
6 Electrode stack
7 Frame element
7a Spacer element
7b Sealing element 8 Contact tab (a: anode/b: cathode)
9 Contact washer
10 Contact pin
11 Fixing screw made of electrically insulating material
20 Elastomeric film/coating
21 Reinforcing element
22 Insulation film/coating
23 O-ring
30 Reservoir (wastewater reservoir)
31 Pump
40 Row of slits

The invention claimed is:

1. An electrolysis cell comprising at least one inlet and at least one outlet for the electrolyte, further comprising a number of planar electrodes provided with openings through which flow can occur, of which at least one is, by means of functional coating, configured as anode having an increased overpotential for the formation of oxygen compared to the standard hydrogen electrode and at least one further electrode is configured as counterelectrode or cathode, which electrodes, on the basis of their polarity, are arranged in an alternating or pairwise alternating sequence to form a stack, further comprising a number of frame elements which in each case are arranged singly between neighbouring electrodes, where the frame elements simultaneously ensure mutual electric insulation, mutual fluid sealing and a defined spacing between the adjoining electrodes and the electrode stack formed in this way is installed between the inlet and the outlet in such a way that an electrolyte path through which flow can occur and which is sealed fluidically from the surroundings is formed from the inlet through the electrode stack to the outlet, wherein neighbouring electrodes have a mutual clear spacing of not more than 0.5 mm, the openings through which flow can occur in the electrodes are configured as parallel slits or rows of slits which break through the electrodes essentially perpendicularly to the surface thereof, where the individual slits have a width of not more than 1.5 mm and a length of at least three times the width and have a clear spacing perpendicular to their maximum dimension of at least twice the slit width, and the slits or rows of slits in neighbouring electrodes in each case run parallel to one another and are arranged in a defined offset manner relative to one another perpendicularly to the maximum dimension of the slits or rows of slits in such a way that the spacing between one row of slits in an electrode to each immediately adjacent row of slits in the directly adjacent electrodes varies by not more than 25%.

2. The electrolysis cell according to claim 1, wherein the anodes are coated with diamond or diamond-like carbon which has been made electrically conductive.

3. The electrolysis cell according to claim 1, wherein the anodes comprise a base material, where the base material is a metal.

4. The electrolysis cell according to claim 3, wherein the metal is selected from the group consisting of niobium, tungsten, tantalum, titanium, doped silicon and alloys of these metals.

5. The electrolysis cell according to claim 1, wherein the cathodes are made of a material selected from the group consisting of stainless steels, nickel-based alloys, copper (alloys) and aluminium (alloys).

6. The electrolysis cell according to claim 1, wherein the width of the slits is less than half the thickness of the electrodes.

7. The electrolysis cell according to claim 1, wherein the width of the slits assumes values of from 0.2 mm to 0.8 mm.

8. The electrolysis cell according to claim 1, wherein a spacing of the slits or rows of slits within each electrode and also in all electrodes within the cell varies by not more than ±10% and assumes values in the range from 2 mm to 10 mm.

9. The electrolysis cell according to claim 1, wherein a mutual clear spacing between adjacent electrodes assumes values of from 0.2 mm to 0.4 mm.

10. The electrolysis cell according to claim 1, wherein the electrodes have a thickness in the range from 0.2 mm to 1.5 mm.

11. The electrolysis cell according to claim 1, wherein the frame elements arranged between the electrodes are either configured as flat-sealing elastomeric film whose thickness defines the mutual spacing of the electrodes and which at the same time brings about fluidic sealing between adjacent electrodes or consist of a nonelastomeric frame whose thickness defines the mutual spacing of the electrodes and also of one or two elastomeric sealing elements which provide the seal between the electrodes or between electrode and frame.

12. The electrolysis cell according to claim 1, wherein the electrodes are provided on their exterior perimeter with contact tabs via which input or output of current can be effected without contact of the inlet leads and connecting elements with the electrolyte.

13. A process comprising:
producing the electrolysis cell according to claim 1 by making the electrodes of the electrolysis cell from predominantly lateral structuring a planar starting body having a thickness of not more than 2 mm.

14. A method of operating the electrolysis cell according to claim 1, the method comprising:
installing the electrolysis cell in an apparatus that allows flow through the electrolysis cell in such a way that superficial velocities in the range from 0.3 m/s to 3 m/s are achieved within the slits in the electrodes of the electrolysis cell.

* * * * *